United States Patent
Collins

(10) Patent No.: US 10,001,884 B2
(45) Date of Patent: Jun. 19, 2018

(54) VOLTAGE DRIVEN SELF-CAPACITANCE MEASUREMENT

(71) Applicant: Richard Collins, Southampton (GB)

(72) Inventor: Richard Collins, Southampton (GB)

(73) Assignee: Atmel Corporation, Chandler, AZ (US)

( * ) Notice: Subject to any disclaimer, the term of this patent is extended or adjusted under 35 U.S.C. 154(b) by 0 days. days.

(21) Appl. No.: 13/953,161

(22) Filed: Jul. 29, 2013

(65) Prior Publication Data

US 2015/0029130 A1 Jan. 29, 2015

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04108* (2013.01)

(58) Field of Classification Search
CPC ...... G06F 3/044; G06F 3/0418; G06F 3/0416; G06F 2203/04108
See application file for complete search history.

(56) References Cited

U.S. PATENT DOCUMENTS

| | | | |
|---|---|---|---|
| 6,731,121 B1 * | 5/2004 | Hsu et al. | ............ 324/678 |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 9,069,425 B2 * | 6/2015 | Shin et al. | |
| 2009/0309851 A1 * | 12/2009 | Bernstein | ............ 345/174 |
| 2009/0315854 A1 | 12/2009 | Matsuo | |
| 2010/0071459 A1 * | 3/2010 | Kamm | ............ G01D 3/036 |
| | | | 73/304 C |
| 2010/0315102 A1 * | 12/2010 | Portmann | ............ G06F 3/0416 |
| | | | 324/680 |
| 2012/0049869 A1 * | 3/2012 | Kremin et al. | ............ 324/679 |

(Continued)

FOREIGN PATENT DOCUMENTS

WO WO 2012/129247 A2 9/2012

OTHER PUBLICATIONS

Chaniotakis and Cory. (2006, Spring). "Operational Amplifier Circuits". MIT Electrical Engineering Courses. Retrieved Feb. 4th, 2017 from https://ocw.mitedu/courses/electrical-engineering-and-computer-science/6-071j-introduction-to-electronics-signals-and-measurement-spring-2006/lecture-notes/23_op_amps2.pdf.*

(Continued)

*Primary Examiner* — Ilana L Spar
*Assistant Examiner* — Darlene M Ritchie
(74) *Attorney, Agent, or Firm* — Baker Botts L.L.P.

(57) ABSTRACT

In one embodiment, a method includes substantially simultaneously applying a pre-determined voltage to a sense electrode and a corresponding drive electrode of a touch sensor. The application of the pre-determined voltage providing a measurement current at a capacitance including the sense electrode. The method also includes determining a difference between the measurement current at the capacitance and a reference value; and determining whether a proximity input to the touch sensor has occurred based at least in part on the difference.

10 Claims, 5 Drawing Sheets

(56) References Cited

U.S. PATENT DOCUMENTS

| | | |
|---|---|---|
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0256868 A1* | 10/2012 | Choi ................. G06F 3/044 345/174 |
| 2012/0293446 A1* | 11/2012 | Crandall ............ G06F 3/044 345/174 |
| 2013/0076612 A1 | 3/2013 | Myers |
| 2014/0043279 A1* | 2/2014 | Pedersen et al. ............ 345/174 |
| 2014/0111464 A1* | 4/2014 | Bakken et al. ............... 345/174 |
| 2014/0139478 A1* | 5/2014 | Lee et al. .................... 345/174 |
| 2014/0176482 A1* | 6/2014 | Wei ................... G06F 3/0418 345/174 |
| 2014/0360854 A1* | 12/2014 | Roziere ............. G06F 3/0412 200/5 R |
| 2014/0362040 A1* | 12/2014 | Mo et al. ..................... 345/174 |
| 2014/0375593 A1* | 12/2014 | Singh ................ G06F 3/0416 345/174 |
| 2015/0002452 A1* | 1/2015 | Klinghult ........... G06F 3/0416 345/174 |

OTHER PUBLICATIONS

Clayton, George and Winder, Steve. (2003). "Operational Amplifiers Fifth Edition". Newnes. pp. 171,181,184,185.*
U.S. Appl. No. 61/454,936, filed Mar. 21, 2011, Myers.
U.S. Appl. No. 454,950, filed Mar. 21, 2011, Lynch.
U.S. Appl. No. 61/454,894, filed Mar. 21, 2011, Rothkopf.

* cited by examiner

VOLTAGE DRIVEN SELF-CAPACITANCE MEASUREMENT

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the touch sensor, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
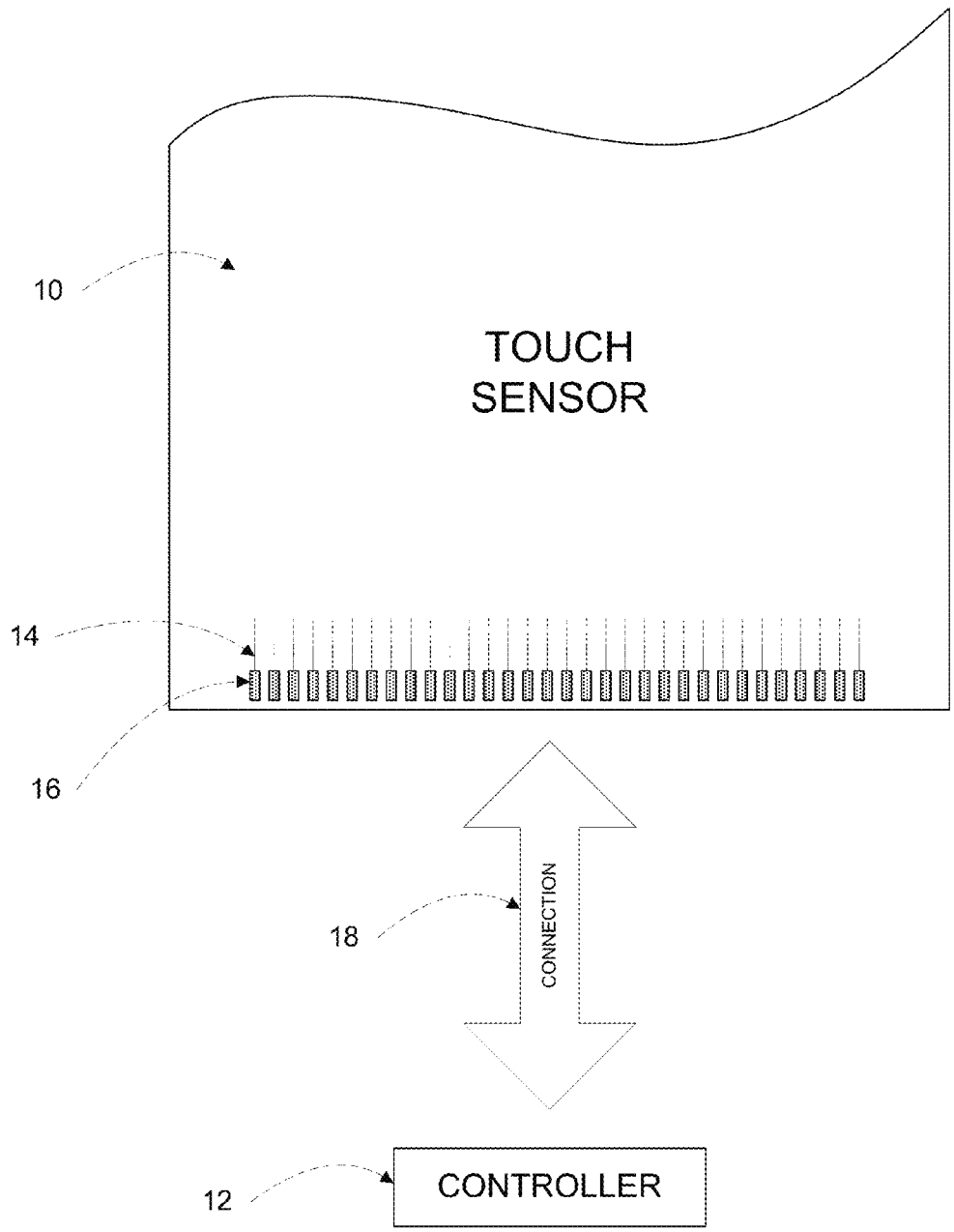
FIG. 1 illustrates an example array of touch sensors with an example touch-sensor controller.

FIG. 1 illustrates an example touch sensor array with an example touch-sensor controller. Touch sensor array 10 and touch-sensor controller 12 may detect the presence and location of a touch or the proximity of an object within a touch-sensitive area of touch sensor array 10. Herein, reference to a touch sensor array may encompass both the touch sensor and its touch-sensor controller, where appropriate. Similarly, reference to a touch-sensor controller may encompass both the touch-sensor controller and its touch sensor array, where appropriate. Touch sensor array 10 may include one or more touch-sensitive areas, where appropriate. Touch sensor array 10 may include an array of electrodes disposed on one or more substrates, which may be made of a dielectric material. Herein, reference to a touch sensor array may encompass both the electrodes of the touch sensor and the substrate(s) that they are disposed on, where appropriate. Alternatively, where appropriate, reference to a touch sensor array may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor array 10 may constitute in whole or in part one or more macro-features of the touch sensor array 10. One or more characteristics of the implementation of those shapes (such as, for example, the conductive materials, fills, or patterns within the shapes) may constitute in whole or in part one or more micro-features of the touch sensor array 10. One or more macro-features of a touch sensor array 10 may determine one or more characteristics of its functionality, and one or more micro-features of the touch sensor array 10 may determine one or more optical features of the touch sensor, such as transmittance, refraction, or reflection.

A mechanical stack may contain the substrate (or multiple substrates) and the conductive material forming the electrodes of touch sensor array 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor array 10 may be made of polyethylene terephthalate (PET) or another suitable material. This disclosure contemplates any suitable substrate with any suitable portions made of any suitable material. In particular embodiments, the electrodes in touch sensor array 10 may be made of ITO in whole or in part. In particular embodiments, the electrodes in touch sensor array 10 may be made of fine lines of metal or other conductive material. As an example and not by way of limitation, one or more portions of the conductive material may be copper or copper-based and have a thickness of approximately 5 microns (µm) or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
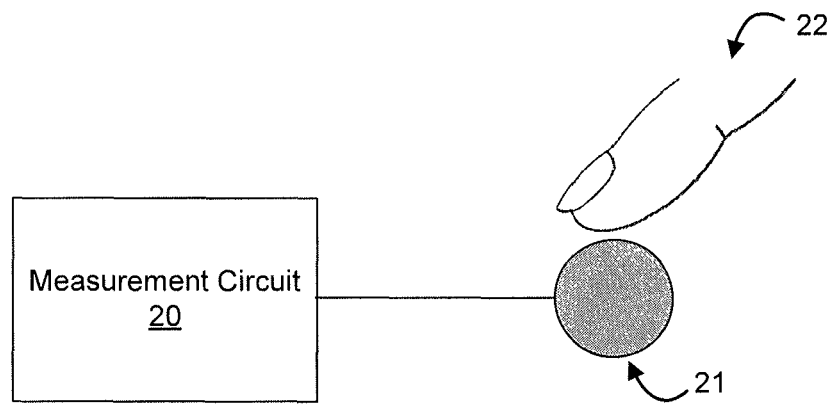
FIGS. 2A-B illustrate an example self-capacitance measurement.
Figure 2B:
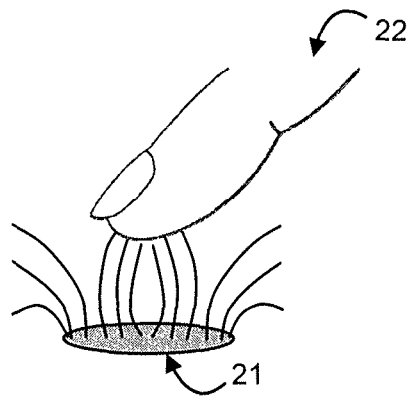

FIGS. 2A-B illustrate an example self-capacitance measurement. In the example of FIG. 2A, an electrode 21 of the touch sensor is coupled to a measurement circuit 20. As described below, electrode 24 forms a capacitance to ground that is distributed in free space. In particular embodiments, the capacitance to ground may include multiple elements, such as for example, capacitance of the tracks in the silicon, tracks on the printed circuit board (PCB), electrodes 21 made from conductive material (ITO, copper mesh, etc.), or an object providing a touch input. Electrode 21 has capacitive coupling to ground through the surrounding objects that are galvanically or capacitively connected to ground. As described above, measurement circuit 20 of the touch-sensor controller transmits a drive signal and senses a signal indicative of a touch or proximity input, from for example a finger 22, through electrode 21. In particular embodiments, measurement circuit 20 of the touch-sensor controller generates the drive signal transmitted by electrode 21 and senses the capacitance to ground. The capacitance of the surrounding material includes at least in part, the capacitance between electrode 21 and ground with finger 22 providing the touch or proximity input. As an example and not by way of limitation, the capacitance provided by finger 22 providing the touch or proximity input may add 5-10% of the capacitance sensed by electrode 21.

In the example of FIG. 2B, the drive signal transmitted by electrode 21 generates an electric field that emanates from electrode 21 to a signal ground of the touch sensor. The signal ground is galvanically or capacitively coupled to ground. The presence of an object, such as for example finger 22, affects the electric field and in turn the amount of charge sensed at electrode 21 by measurement circuit 20. As finger 22 approaches electrode 21, the capacitance between electrode 21 and ground detected by measurement circuit 20 increases. In particular embodiments, the increase of the capacitance between electrode and ground may be measured by measurement circuit 20 as a decrease of voltage at the capacitance between electrode and ground. Although this disclosure describes the measurement circuit being integrated with a touch-sensor controller, this disclosure contemplates a measurement circuit being a discrete circuit or part of any suitable circuit.

Figure 3:
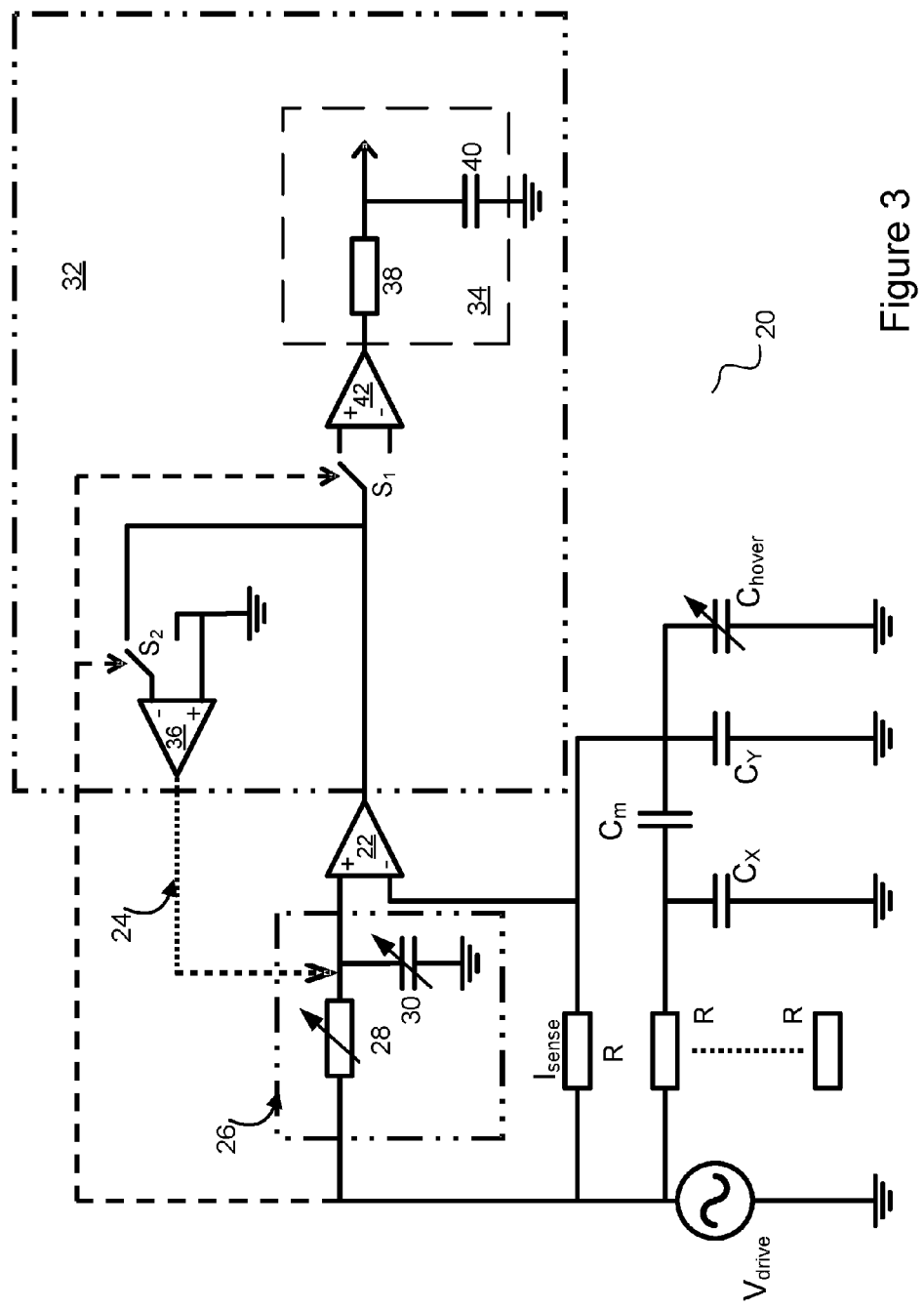
FIG. 3 illustrates an example circuit schematic for voltage driven self-capacitance measurements.

FIG. 3 illustrates an example circuit schematic for voltage driven self-capacitance measurements. Voltage driven self-capacitance measurement circuit 20 may determine a change of a touch sensor capacitance schematically illustrated in the example of FIG. 3 by capacitance $C_{hover}$. In particular embodiments, capacitance $C_{hover}$ is formed in part between an electrode of the touch sensor and other conductive material of the touch sensor (not shown) that is capacitively or galvanically coupled to ground. Capacitance $C_{hover}$ is the capacitance from a sense electrode to the "touching" object or the capacitance change being measured. The capacitance formed between an electrode of the touch sensor and other conductive material of the touch sensor that is capacitively or galvanically coupled to ground is part of a parasitic electrode capacitance $C_Y$ or $C_X$. As an example and not by way of limitation, the other conductive material of the touch sensor may include portions of tracks, pins, or internal network of the touch sensor. Furthermore, the electrode of the touch sensor senses the capacitance between an object, such as for example a finger or stylus, providing the touch or proximity input through the electric field transmitted by a drive electrode. As described above, a pair of drive and sense electrodes capacitively coupled to each other across a space between them may form a capacitive node. In the example of FIG. 3, the capacitance of the drive electrodes, sense electrodes, and the capacitive coupling between the drive and sense electrodes are schematically illustrated by capacitors $C_X$, $C_Y$, and $C_m$, respectively. Capacitance $C_{hover}$, that may include in part capacitance of the sense electrode $C_Y$, is coupled to a voltage source that provides a pre-determined alternating-current (AC) voltage $V_{drive}$ through a resistor R. As an example and not by way of limitation, each sense electrode of the touch sensor has an associated capacitance $C_{hover}$. Each drive electrode, schematically represented by $C_X$ in the example of FIG. 3, is coupled to the voltage source that provides pre-determined voltage $V_{drive}$ through associated resistor R. Furthermore, as illustrated in the example of FIG. 3, capacitor $C_m$ schematically illustrates the capacitive coupling between the drive and sense electrodes and capacitor $C_m$ has a terminal coupled to $C_X$ and $C_Y$.

In particular embodiments, capacitance $C_{hover}$ is coupled to a negative input of differential amplifier 22. Measurement circuit 20 may include a control loop 24 with a reference path 26 that is coupled to a positive input of differential amplifier 22. In particular embodiments, reference path 26 may include an adjustable resistor 28 coupled in series with an adjustable capacitor 30. The output of differential amplifier 22 is coupled to an input of lock-in amplifier 42 and a negative input of a differential amplifier 36 of control loop 24 through switches $S_1$ and $S_2$, respectively. Furthermore, toggling of switches $S_1$ and $S_2$ may be controlled by pre-determined voltage $V_{drive}$. As an example and by way of limitation, lock-in demodulation circuit 32 may include lock-in amplifier 42. In particular embodiments, the output of lock-in demodulation circuit 32 is coupled to a low-pass filter circuit 34. As an example and not by way of limitation, low-pass filter circuit 34 may include a resistor 38 coupled in series with a capacitor 40. As another example, lock-in demodulation circuit 32 may be an analog implementation, digital implementation, or any combination thereof. Although this disclosure describes and illustrates a particular arrangement of particular components for the measurement circuit, this disclosure contemplates any suitable arrangement of any suitable components for the measurement circuit.

In particular embodiments, the voltage source substantially simultaneously applies pre-determined voltage $V_{drive}$ to capacitors $C_x$ and $C_y$ that schematically represent a drive and corresponding sense electrode, respectively. As an example and not way of limitation, pre-determined voltage $V_{drive}$ may be a sine wave having a pre-determined amplitude and period. The substantially simultaneous application of the pre-determined voltage on $C_x$ and $C_y$ substantially negates the capacitive coupling between the drive and sense electrodes, schematically represented by $C_m$, thereby substantially isolating $C_y$ and $C_{hover}$ from $C_x$. As an example and not by way of limitation, pre-determined voltage $V_{drive}$ may be substantially simultaneously applied to the totality of the drive and sense electrodes of the touch sensor. In particular embodiments, the voltage at $C_{hover}$ is an input to differential amplifier 22, as described above, and is a function of a current provided to $C_{hover}$ by the application of $V_{drive}$ through resistor R. Furthermore, a proximity input detected through the sense electrode causes the capacitance of $C_{hover}$ to increase relative to the capacitance of $C_{hover}$ without the proximity input, as described above, thereby increasing the current through resistor R. As described below, the presence of the proximity input may be determined based at least in part on a relative difference between the values of the current with and without the proximity input.

As described above, an input to control loop 24 is the output voltage of differential amplifier 36. In particular embodiments, the input to differential amplifier 36 is toggled between the output voltage of differential amplifier 22 and ground based on the state of switch $S_2$. As described above, switch $S_2$ may be toggled by pre-determined voltage $V_{drive}$ provided to switch $S_2$. The inputs to differential amplifier 22 may include the voltage at $C_{hover}$ and the output voltage from reference path 26. In particular embodiments, the output voltage of reference path 26 may be adjusted in real-time to substantially match the voltage at capacitance $C_{hover}$. As an example and not by way of limitation, the output voltage of reference path 26 may be determined through modification of adjustable resistor 28 and adjustable capacitor 30 of reference path 26. As described below, the output voltage of differential amplifier 22 may be determined by the difference between the voltage at capacitance $C_{hover}$ and the output voltage from reference path 26. Furthermore, the output voltage of reference path 26 may be adjusted in real-time to match the voltage at capacitance $C_{hover}$.

As described above, lock-in demodulation circuit 32 may receive the output voltage from differential amplifier 22. As an example and not by way of limitation, the output voltage from differential amplifier 22 is toggled between the positive and negative inputs of lock-in amplifier 42 through switch $S_1$. Furthermore, toggling of switch $S_1$ may be controlled by pre-determined voltage $V_{drive}$. As an example and not by way of limitation, in a case where pre-determined voltage $V_{drive}$ is a sine wave, the input of lock-in amplifier 42 may be toggled between the output voltage from differential amplifier 22 and the inverse of the output voltage from differential amplifier 22 every half cycle of pre-determined voltage $V_{drive}$. In particular embodiments, lock-in demodulation circuit 32 may include a lock-in amplifier. Furthermore, lock-in demodulation circuit 32 may effectively multiply the output voltage from differential amplifier 22 by the pre-determined voltage $V_{drive}$. In particular embodiments, lock-in demodulation circuit 32 may receive pre-determined voltage $V_{drive}$ as a frequency reference.

The output voltage from differential amplifier 22 may be represented as a series of sine waves with differing amplitudes, frequency and phases, and substantially all the components of the output voltage from differential amplifier 22 are multiplied by pre-determined voltage $V_{drive}$ by lock-in demodulation circuit 32. In the frequency domain, components of the output voltage from differential amplifier 22 with differing frequencies relative to pre-determined voltage $V_{drive}$ are orthogonal and their product is substantially zero. The product of one or more components of the output voltage from differential amplifier 22 with substantially equal frequency relative to pre-determined voltage $V_{drive}$ is a voltage that is proportional to pre-determined voltage $V_{drive}$. Although this disclosure describes a particular method of measuring a relatively small signal, this disclosure contemplates any suitable method of measuring a small signal, such as for example using a high-gain amplifier.

As described above, the output voltage of lock-in demodulation circuit 32 is processed through low-pass filter circuit 34. Although this disclosure illustrates and describes a particular low-pass filter with a particular number of filter stages implemented using particular components, this disclosure contemplates any suitable filter with any suitable number of stages implemented using any suitable components, such as for example a digital filter. In particular embodiments, passing the output voltage of lock-in demodulation circuit 32 through low-pass filter circuit 34 may attenuate components of the output voltage with frequencies that differ from the frequency of pre-determined voltage $V_{drive}$. Furthermore, the amount of attenuation associated with low-pass filter circuit 34 may depend on the bandwidth and roll-off associated with low-pass filter circuit 34. As an example and not by way of limitation, the bandwidth and roll-off associated with low-pass filter circuit 34 may be determined at least in part by resistor 38 and capacitor 40.

Figure 4A:
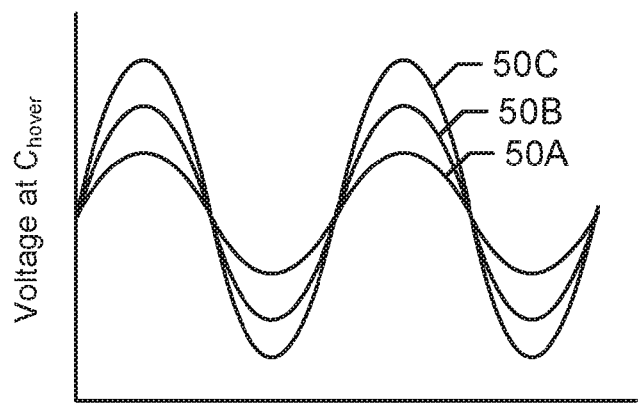
FIGS. 4A-C illustrate example voltages for a self-capacitance measurement.
Figure 4B:
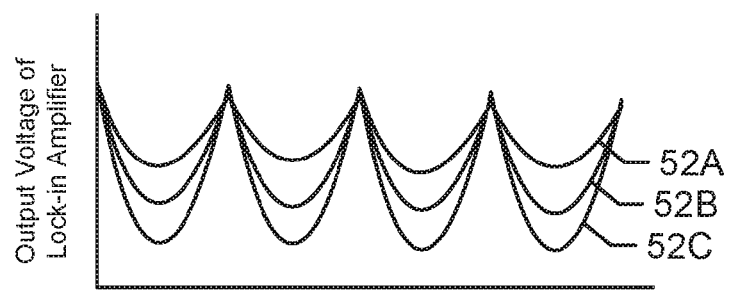
Figure 4C:
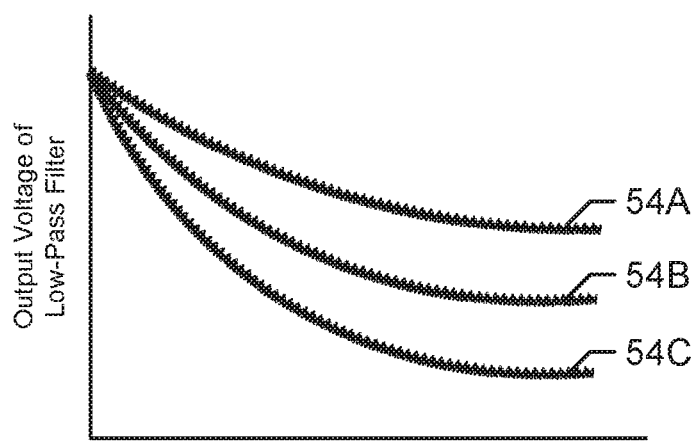

FIGS. 4A-C illustrate example voltages of an example voltage driven self-capacitance measurement. As illustrated by the examples of FIGS. 4A-C, example voltages 50A-C, 52A-C, and 54A-C of the example voltage driven self-capacitance circuit vary based at least in part on whether a proximity input is detected. As described above, a drive electrode and a corresponding sense electrode that is capacitively coupled to the drive electrode may be substantially simultaneously biased with a pre-determined voltage. As an example and not by way of limitation, the pre-determined voltage may be a sinusoidal voltage waveform. In particular embodiments, the magnitude of the voltage at capacitance $C_{hover}$ may decrease in the presence of a proximity input as the current through the resistor increases due at least in part to the increase in capacitance $C_{hover}$. As described above, the output voltage at differential amplifier 22 is the difference between the voltage at capacitance $C_{hover}$ and the output voltage of the reference path. In particular embodiments, the voltage of the reference path is set to be substantially equal to the voltage at capacitance $C_{hover}$, thereby setting output voltage of differential amplifier 22 at substantially zero. As illustrated in the example of FIG. 4A by voltages 50A-C, increasing the current through the resistor increases the difference between the voltage at capacitance $C_{hover}$ and the output voltage of the reference path. As an example and not by way of limitation, increasing proximity of a finger to the sense electrode increases capacitance $C_{hover}$, thereby increasing the current through the resistor and causing a transitory increase in the difference between the voltage at capacitance $C_{hover}$ and the output voltage of the reference path until a time when the output voltage of the reference path matches the voltage at capacitance $C_{hover}$ with the proximity input. For example, the output voltage 50A of differential amplifier 22 may result from a proximity input a distance above a sense electrode, while the output voltage 50C of differential amplifier 22 may result from a proximity input that is closer to the sense electrode relative to the distance associated with the output voltage 50C.

As described above, the output voltage from differential amplifier 22 is toggled between the positive and negative inputs of the lock-in amplifier through switch S1 as controlled by the pre-determined voltage, as illustrated in the example of FIG. 3. In particular embodiments, output voltage 52A-C of the lock-in amplifier amplifies the output voltage of differential amplifier 22 by the pre-determined voltage, as illustrated in the example of FIG. 4B. In particular embodiments, toggling the output voltage of differential amplifier 22 at the input of the lock-in amplifier may result in output voltage 52A-C that has the same sign at each half cycle of the pre-determined voltage, as illustrated in the example of FIG. 4B. In particular embodiments, the output voltage of the lock-in amplifier increases in magnitude in the presence of a proximity input with a substantially similar dependency on capacitance $C_{hover}$ as voltage 50A-C illustrated in the example of FIG. 4A.

As described above, output voltage 52A-C from the lock-in demodulation circuit is provided to the low-pass filter circuit, as illustrated in the example of FIG. 3. In particular embodiments, passing output voltage 52A-C from the lock-in demodulation circuit through the low-pass filter circuit provides a direct-current (DC) voltage 54A-C that is a function of capacitance $C_{hover}$. As described above, the low-pass filter circuit attenuates components of output voltage 52A-C with higher frequency determined by the characteristics of the low-pass filter circuit. Furthermore, the reference path of the control loop may be configured to maintain the output voltage 50A-C of differential amplifier 22 substantially equal to the voltage at capacitance $C_{hover}$ without a proximity input, thereby setting the output voltage 50A-C of differential amplifier 22 substantially equal to zero without a proximity input. As an example and not by way of limitation, changes in the current applied to capacitance $C_{hover}$ due to a proximity input may be determined through providing output voltage 54A-C to a high gain amplifier. In particular embodiments, output voltage 54A-C increases in magnitude in the presence of a proximity input with a substantially similar dependency on capacitance $C_{hover}$ as output voltage 50A-C illustrated in the example of FIG. 4A. Although this disclosure describes and illustrates particular voltage levels in response to detection of a proximity input relative to a reference level, this disclosure contemplates any suitable voltage levels in response to detection of a proximity input relative to any suitable reference level.

Figure 5:
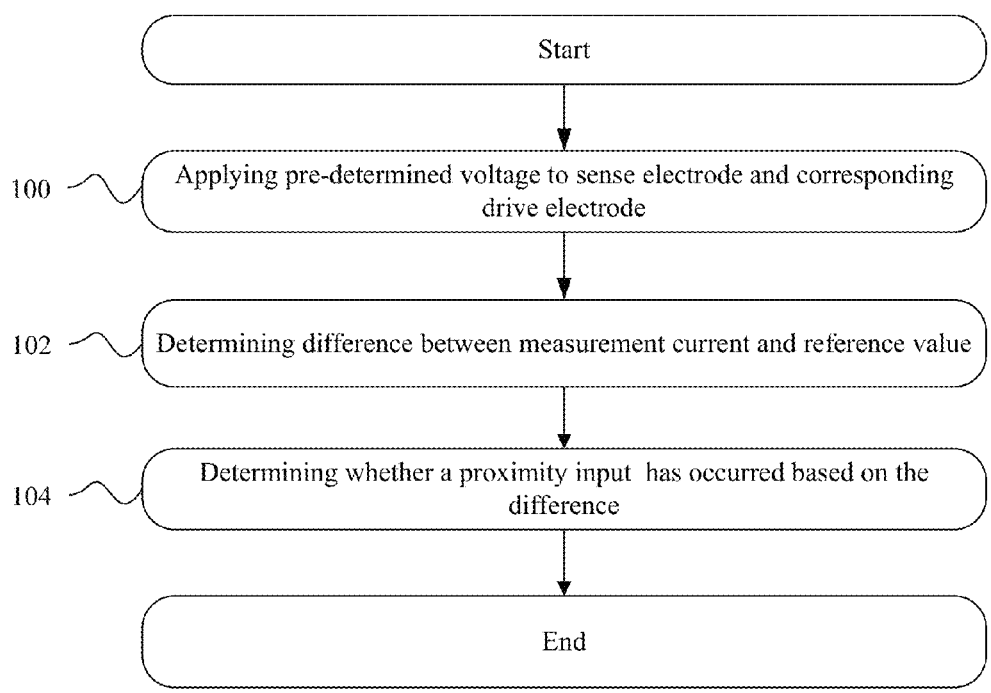
FIG. 5 illustrates an example method for voltage driven self-capacitance measurements.

FIG. 5 illustrates an example method for voltage driven self-capacitance measurements. The method may start at step 100, where a pre-determined voltage is substantially simultaneously applied to a sense electrode and a corresponding drive electrode of a touch sensor. In particular embodiments, the application of the pre-determined voltage provides a measurement current at a capacitance that includes the sense electrode. Step 102 determines a difference between the measurement current at the capacitance and a reference value. At step 104, whether a proximity input to the touch sensor has occurred is determined based at least in part on the difference, at which point the method may end. Although this disclosure describes and illustrates particular steps of the method of FIG. 5 as occurring in a particular order, this disclosure contemplates any suitable steps of the method of FIG. 5 occurring in any suitable order. Particular embodiments may repeat one or more steps of the method of FIG. 5, where appropriate. Moreover, although this disclosure describes and illustrates an example method for voltage driven self-capacitance measurements including the particular steps of the method of FIG. 5, this disclosure contemplates any suitable method for voltage driven self-capacitance measurements including any suitable steps, which may include all, some, or none of the steps of the method of FIG. 5, where appropriate. Moreover, although this disclosure describes and illustrates particular components carrying out particular steps of the method of FIG. 5, this disclosure contemplates any suitable combination of any suitable components carrying out any suitable steps of the method of FIG. 5.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   coupling a first electrode of a touch sensor and a corresponding second electrode of the touch sensor to a voltage source, wherein the first electrode is capacitively coupled to the second electrode;
   applying, through the voltage source, a pre-determined voltage to the first electrode and also substantially simultaneously applying the pre-determined voltage to the corresponding second electrode, the application of the pre-determined voltage providing a measurement current at a capacitance comprising the first electrode, wherein the measurement current results in a voltage at a negative input to a differential amplifier, and wherein the first electrode is oriented in a first orientation and the second electrode is oriented in a second orientation;
   determining a difference between the measurement current at the capacitance and a reference value;
   adjusting in real time a voltage of a reference path coupled to a positive input of the differential amplifier such that a voltage at the positive input of the differential amplifier is substantially equal to the voltage at the negative input of the differential amplifier resulting from the measurement current;
   toggling an input of a lock-in demodulation circuit between an output voltage of the differential amplifier and an inverse of the output voltage from the differential amplifier every half cycle of the pre-determined voltage, wherein the output voltage of the differential amplifier is a function of the difference between the measurement current at the capacitance and the reference value, and wherein the pre-determined voltage comprises an alternating-current (AC) voltage;
   generating an output voltage of the lock-in demodulation circuit by multiplying the voltage at the negative input to the differential amplifier by the pre-determined voltage, wherein the multiplication comprises applying lock-in demodulation to the voltage at the negative input to the differential amplifier; and
   determining whether a proximity input to the touch sensor has occurred based at least in part on the output voltage.

2. The method of claim 1, wherein the application of the pre-determined voltage comprises substantially simultaneously applying the pre-determined voltage to a plurality of second electrodes and a plurality of first electrodes, the plurality of second and first electrodes comprising all electrodes of the touch sensor.

3. The method of claim 1, wherein applying lock-in demodulation comprises attenuating one or more components of the voltage at the capacitance out of phase with the pre-determined voltage.

4. The method of claim 1, further comprising applying low-pass filtering to the output voltage.

5. A non-transitory computer-readable storage medium embodying logic configured when executed to:
   couple a first electrode of a touch sensor and a corresponding second electrode of the touch sensor to a voltage source, wherein the first electrode is capacitively coupled to the second electrode;
   apply, through the voltage source, a pre-determined voltage to the first electrode and also substantially simultaneously apply the pre-determined voltage to the corresponding second electrode, the application of the pre-determined voltage providing a measurement current at a capacitance comprising the first electrode wherein the measurement current results in a voltage at a negative input to a differential amplifier, and wherein the first electrode is oriented in a first orientation and the second electrode is oriented in a second orientation;
   determine a difference between the measurement current at the capacitance and a reference value;
   adjust in real time a voltage of a reference path coupled to a positive input of the differential amplifier such that a voltage at the positive input of the differential amplifier is substantially equal to the voltage at the negative input of the differential amplifier resulting from the measurement current;
   toggle an input of a lock-in demodulation circuit between an output voltage of the differential amplifier and an inverse of the output voltage from the differential amplifier every half cycle of the pre-determined voltage, wherein the output voltage of the differential amplifier is a function of the difference between the measurement current at the capacitance and the reference value, and wherein the pre-determined voltage comprises an alternating-current (AC) voltage;
   generate an output voltage of the lock-in demodulation circuit by multiplying the voltage at the negative input to the differential amplifier by the pre-determined voltage, wherein the multiplication comprises applying lock-in demodulation to the voltage at the negative input to the differential amplifier; and determine whether a touch input to the touch sensor has occurred based at least in part on the output voltage.

6. The medium of claim 5, wherein the software is further configured to substantially simultaneously apply the pre-determined voltage to a plurality of second electrodes and a plurality of first electrodes, the plurality of second and first electrodes comprising all electrodes of the touch sensor.

7. The medium of claim 5, wherein the software is further configured to attenuate one or more components of the voltage at the capacitance out of phase with the pre-determined voltage.

8. The medium of claim 5, wherein the software is further configured to apply low-pass filtering to the output voltage.

9. A device comprising:
a measurement circuit; and
a non-transitory computer-readable storage medium coupled to the measurement circuit and embodying logic configured when executed to:
couple a first electrode of a touch sensor and a corresponding second electrode of the touch sensor to a voltage source, wherein the first electrode is capacitively coupled to the second electrode;
apply, through the voltage source, a pre-determined voltage to the first electrode and also substantially simultaneously apply the pre-determined voltage to the corresponding second electrode, the application of the pre-determined voltage providing a measurement current at a capacitance comprising the first electrode, wherein the measurement current results in a voltage at a negative input to a differential amplifier, and wherein the first electrode is oriented in a first orientation and the second electrode is oriented in a second orientation;
determine a difference between the measurement current at the capacitance and a reference value;
adjust in real time a voltage of a reference path coupled to a positive input of the differential amplifier such that a voltage at the positive input of the differential amplifier is substantially equal to the voltage at the negative input of the differential amplifier resulting from the measurement current; and
toggle an input of a lock-in demodulation circuit between an output voltage of the differential amplifier and an inverse of the output voltage from the differential amplifier every half cycle of the pre-determined voltage, wherein the output voltage of the differential amplifier is a function of the difference between the measurement current at the capacitance and the reference value, and wherein the pre-determined voltage comprises an alternating-current (AC) voltage;
generate an output voltage of the lock-in demodulation circuit by multiplying the voltage at the negative input to the differential amplifier by the pre-determined voltage, wherein the multiplication comprises applying lock-in demodulation to the voltage at the negative input to the differential amplifier; and
determine whether a touch input to the touch sensor has occurred based at least in part on the output voltage.

10. The device of claim 9, wherein the software is further configured to substantially simultaneously apply the pre-determined voltage to a plurality of second electrodes and a plurality of first electrodes, the plurality of second and first electrodes comprising all electrodes of the touch sensor.

* * * * *